US006092841A

United States Patent [19]

Best et al.

[11] Patent Number: 6,092,841

[45] Date of Patent: Jul. 25, 2000

[54] PROMOTIONAL ONE-PIECE MAILER ASSEMBLY HAVING AN INTEGRAL COUPON CARD

[75] Inventors: Scott D. Best, Troy; James F. Turner, Farmington Hills, both of Mich.

[73] Assignee: Saxon, Inc., Ferndale, Mich.

[21] Appl. No.: 09/437,431

[22] Filed: Nov. 17, 1999

Related U.S. Application Data

[60] Provisional application No. 60/108,689, Nov. 17, 1998.

[51] Int. Cl.[7] .................... G09B 19/00

[52] U.S. Cl. .................... 283/56; 283/51; 283/116

[58] Field of Search .................... 283/51, 56, 61, 283/62, 117, 903, 81, 100, 101, 116; 229/92.8

[56] References Cited

U.S. PATENT DOCUMENTS

| | | | |
|---|---|---|---|
| 1,258,922 | 3/1918 | Marco | 283/51 |
| 1,415,596 | 5/1922 | McKinnie . | |
| 1,957,374 | 5/1934 | Unger . | |
| 4,479,838 | 10/1984 | Dunsirn et al. | 283/81 X |
| 4,742,954 | 5/1988 | Shishido | 229/92.8 |
| 4,767,654 | 8/1988 | Riggsbee | 40/310 X |
| 4,778,153 | 10/1988 | Bachman et al. | 283/101 |
| 4,892,246 | 1/1990 | Norman | 229/92.8 |
| 4,915,287 | 4/1990 | Volk et al. | 283/51 X |
| 4,957,311 | 9/1990 | Geisenheimer | 283/56 |
| 5,076,490 | 12/1991 | Dulin | 229/92.8 |
| 5,100,179 | 3/1992 | Burden et al. | 283/62 |
| 5,228,723 | 7/1993 | Hertig | 283/100 |
| 5,308,120 | 5/1994 | Thompson | 283/70 |
| 5,417,458 | 5/1995 | Best et al. | 283/51 |
| 5,458,282 | 10/1995 | Martin | 283/56 X |
| 5,468,021 | 11/1995 | Ovadia | 283/56 |
| 5,495,981 | 3/1996 | Warther | 283/81 X |
| 5,571,358 | 11/1996 | Napier et al. | 156/227 |
| 5,641,116 | 6/1997 | Martin . | |
| 5,776,287 | 7/1998 | Best et al. | 283/51 |
| 5,799,981 | 9/1998 | Tung et al. | 283/56 |
| 5,836,622 | 11/1998 | Fabel | 283/62 |

*Primary Examiner*—Willmon Fridie, Jr.
*Attorney, Agent, or Firm*—Howard & Howard

[57] ABSTRACT

A promotional one-piece mailer assembly having two layers of card stock. A release liner is sandwiched between the two layers of card stock. An integral card is formed within the first and second layers of card stock. A plurality of mini-coupons are detachably cut into the integral card through the second layer of card stock. The assembly is characterized by a series of score lines cut through the first and second layers of card stock and the liner and spaced from the peripheral edges of the first and second layers of card stock to completely define the card integrally disposed within the mailer assembly and to securely maintain the card within the mailer assembly.

16 Claims, 2 Drawing Sheets

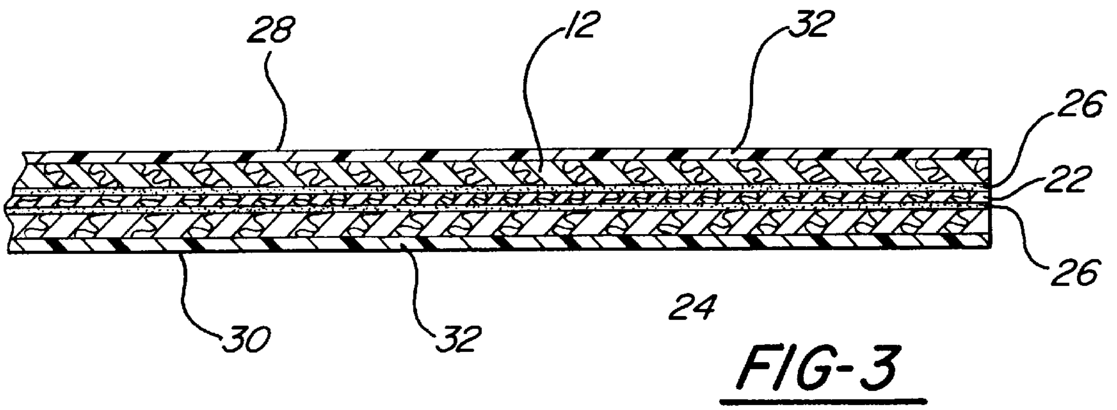
FIG-3
FIG-4
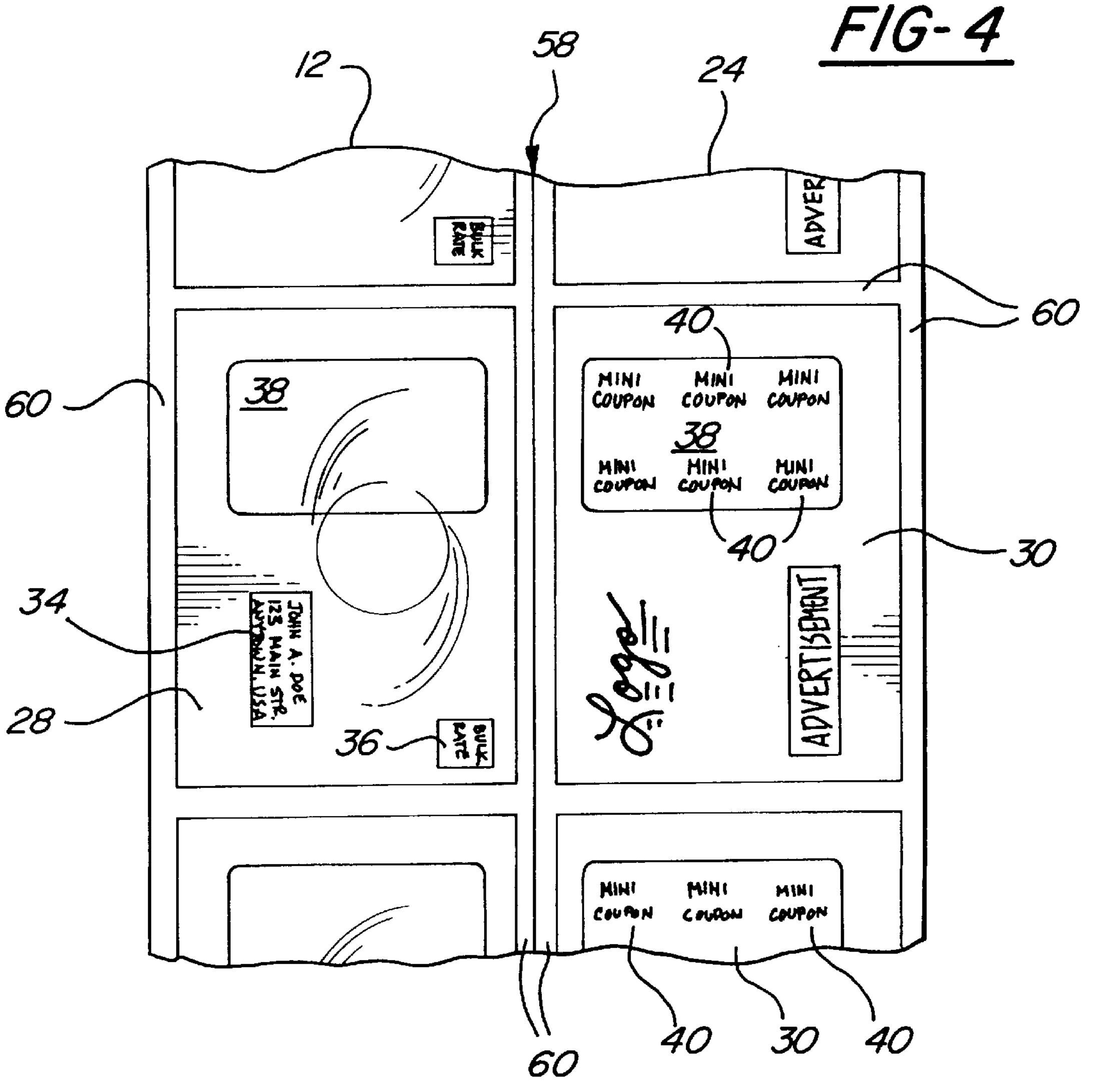

PROMOTIONAL ONE-PIECE MAILER ASSEMBLY HAVING AN INTEGRAL COUPON CARD

RELATED APPLICATION

This patent application claims priority to and all the benefits of U.S. Provisional patent application Ser. No. 60/108,689, filed on Nov. 17, 1998 and entitled "One Piece Mailer with Integral Coupon Card".

BACKGROUND OF THE INVENTION

1) Technical Field

The subject invention relates to coupon cards and in particular to a coupon card disposed within a promotional mailer.

2) Description of the Prior Art

Coupon cards having a number of mini-coupons which may be removed and redeemed are well known. It is also well known to place an individual mini-coupon directly on a product for instant redemption. The mini-coupons are a popular means of attracting customers and encouraging additional sales. The prior art coupon cards and mini-coupons have various constructions and are used for a multitude of applications. Examples of some prior art coupon cards and mini-coupons are disclosed in U.S. Pat. Nos. 4,479,838; 4,767,654; and 5,308,120. Another prior art coupon card having a unique and superior construction is illustrated in U.S. Pat. No. 5,417,458. The '458 patent is assigned to the assignee of the subject invention and includes a novel structure of two layers of card stock sandwiching a liner with adhesive disposed between each layer of card stock and the liner. The two layers of card stock allow the mini-coupons to be removed while maintaining sufficient integrity and rigidity within the card itself.

One-piece promotional mailers are also well known in the art. These mailers are typically sent through the postal service system under a bulk rate postage. The postal service system requires a particular size and format in order to receive the bulk rate postage discount. The standardized size and format for the mailers is needed because of the high volume and speed in which these mailers pass through the postal service's sorting machines.

The mailers usually have advertisements, informational messages and other like promotional verbiage imprinted thereon. There may also be an index card, such as Rolodex® type business card, at least partially attached to the mailer. Specifically, the index cards are at least partially die cut from the mailer. A user then tears the index card out of the mailer. Examples of promotional mailers having removable index cards are disclosed in U.S. Pat. Nos. 4,957,311 and 5,076,490. The prior art mailers, however, are formed of a single sheet of paper material such that the structural integrity of the mailers is in question. In addition, the die cuts reduce the rigidity of the mailers. During the high speed processing of the mailers, the index cards may become detached or deform about the die cuts such that the mailers become destroyed, mutilated, or otherwise damaged.

Accordingly, there is a need for a promotional mailer having sufficient structural integrity to support a removable item disposed within the mailer. In addition, it would be desirable to incorporate the advantages and popularity of the mini-coupons into the convenience of a bulk rate promotional mailer. Finally, it would be even more desirable to incorporate an entire coupon card, having a plurality of mini-coupons, into a structurally sound mailer.

SUMMARY OF THE INVENTION AND ADVANTAGES

A promotional one-piece mailer assembly comprising a first layer of card stock having an exterior surface and an interior surface with a plurality of outer peripheral edges. A liner is adhered to the interior surface of the first layer of card stock. A second layer of card stock, having an exterior surface and an interior surface with a plurality of outer peripheral edges, is aligned with the peripheral edges of the first layer of card stock. The interior surface of the second layer of card stock is adhered to the liner to sandwich the liner between the first and second layers of card stock. An integral card is formed within the first and second layers of card stock. A plurality of mini-coupons are detachably cut into the integral card through the second layer of card stock. The assembly is characterized by a series of score lines cut through the first and second layers of card stock and the liner and spaced from the peripheral edges of the first and second layers of card stock to completely define the card integrally disposed within the mailer assembly and to securely maintain the card within the mailer assembly.

Accordingly, the promotional mailer of the subject invention has a double card stock layer construction for providing adequate structural integrity and rigidity to the mailer. In addition, the card, which is a coupon card having a plurality of mini-coupons, is completely disposed within the mailer such that the score lines do not intersect the peripheral edges. Hence, this also increases the structural integrity of the mailer.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a cross-sectional view of the mailer assembly taken along line 3—3 of FIG. 2; and FIG. 4 is a top view of a series of mailer assemblies during the manufacturing thereof.

DETAILED DESCRIPTION OF THE PREFERRED EMBODIMENT

Figure 1:
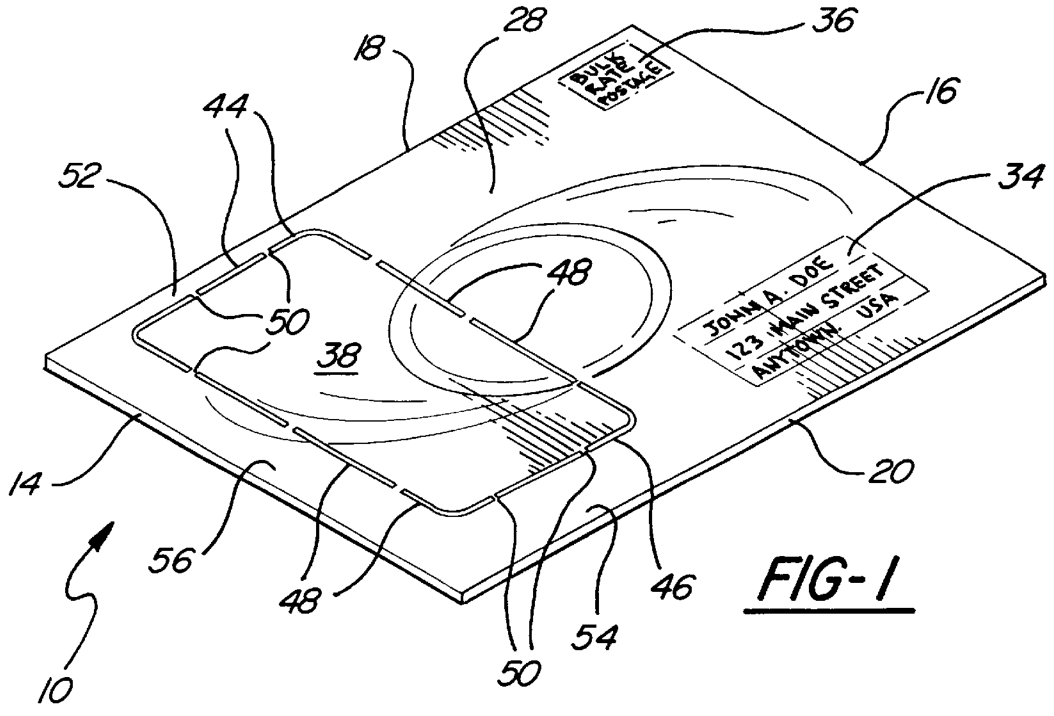
FIG. 1 is a perspective view of a promotional mailer assembly incorporating the novel aspects of the subject invention.
Figure 2:
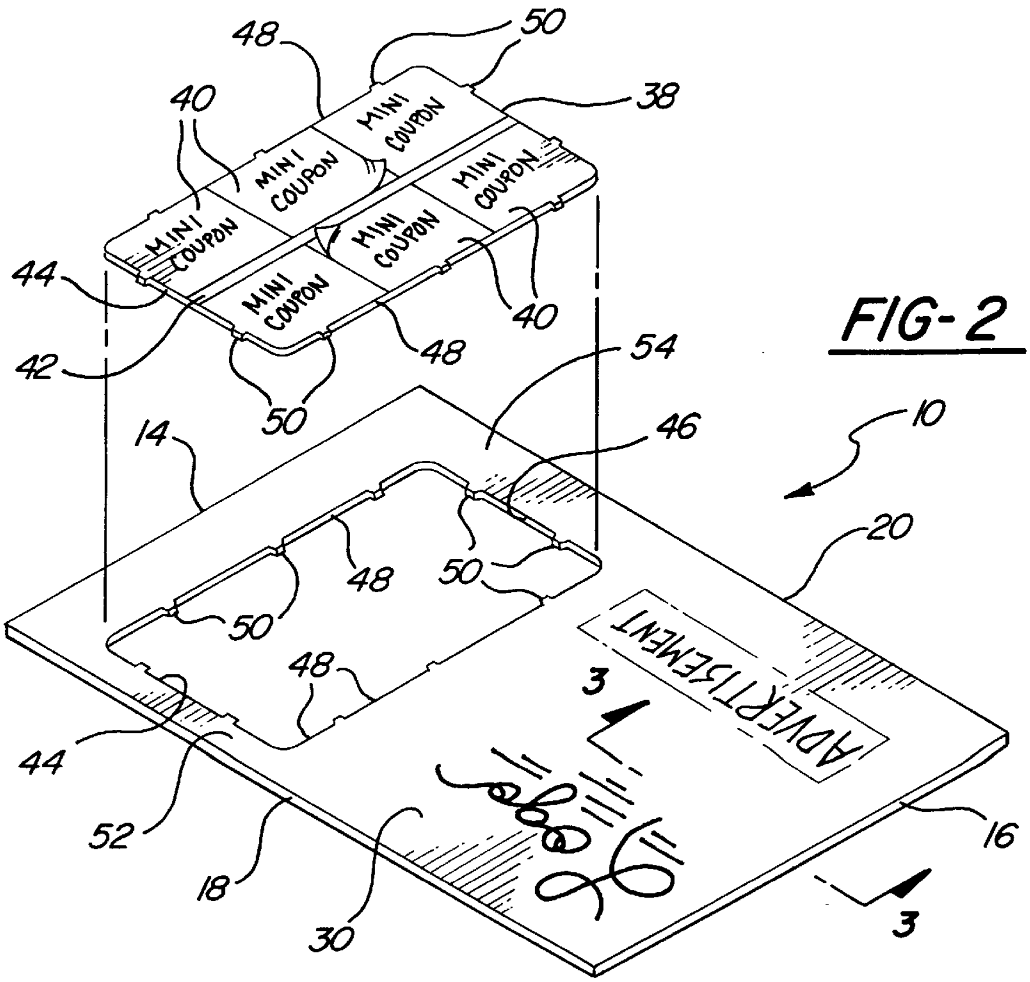
FIG. 2 is a perspective view of the mailer assembly with an integral coupon card detachably spaced therefrom.

Referring to the Figures, wherein like numerals indicate like or corresponding parts throughout the several views, a promotional one-piece mailer assembly is generally shown at 10 in FIGS. 1 and 2. As discussed in the background section, the one-piece mailer assembly 10 is preferably used as a promotional device sent through the postal service system under a bulk rate postage.

Referring also to FIG. 3, the structure of the mailer assembly 10 comprises a first layer of card stock 12 having an exterior surface and an interior surface with a plurality of outer peripheral edges 14, 16, 18, 20. A liner 22 is adhered to the interior surface of the first layer of card stock 12. A second layer of card stock 24, having an exterior surface and an interior surface with a plurality of outer peripheral edges 14, 16, 18, 20, is aligned with the peripheral edges 14, 16, 18, 20 of the first layer of card stock 12. The interior surface of the second layer of card stock 24 is adhered to the liner 22 to sandwich the liner 22 between the first 12 and second 24 layers of card stock. Specifically, an adhesive layer 26 is disposed between each of the interior surfaces of the first 12 and second 24 layers of card stock and the liner 22 to adhere the first 12 and second 24 layers of card stock to the liner 22. In addition, a release coating (not illustrated) is disposed on one side of the liner 22. The completed structure of the mailer 10 preferably has the exterior surface of the first layer of card stock 12 defining a front side 28 of the mailer 10 and the exterior surface of the second layer of card stock 24 defining a back side 30 of the mailer 10. As appreciated, the labeling of the front 28 and back 30 sides of the mailer 10 are purely arbitrary and are provided for illustrative purposes only.

Printed matter (not numbered although illustrated) is imprinted on each of the exterior surfaces of the first 12 and second 24 layers of card stock. Hence, the front 28 and back 30 sides of the mailer 10 are distinguished by the messages conveyed by the printed matter. To protect the printed matter, a laminate 32 is adhered to each of the exterior surfaces of the first 12 and second 24 layers of card stock over the printed matter. As discussed in the background section, the printed matter on the mailers 10 is usually advertisements, logos, informational messages and other like promotional verbiage. As appreciated, the logos, messages and advertisements may be of any size, color, shape or design as desired by a particular vendor.

As best shown in FIG. 1, an addressing area 34 is disposed on the exterior surface of the first layer of card stock 12 for imprinting a portion of the printed matter. In particular, the addressing area 34 is utilized to imprint a desired name and address in which the mailer assembly 10 is to be sent. A postage area 36 is also disposed on the exterior surface of the first layer of card stock 12 for imprinting another portion of the printed matter. The postage area 36 may be imprinted with the bulk rate postage notification or a "place a stamp here" type notification. As appreciated, the addressing 34 and postage 36 areas are preferably imprinted on the front side 28 of the mailer 10.

As also discussed in the background section, the mailer assembly 10 is preferably of a standard size as required by the postal service. The peripheral edges 14, 16, 18, 20 of the first 12 and second 24 layers of card stock therefore each include first 14, second 16, third 18 and fourth 20 peripheral edges with the first 14 and second 16 peripheral edges and the third 18 and fourth 20 peripheral edges each being substantially parallel to each other to define a substantially rectangular mailer assembly 10. In particular, the U.S. postal service requires that the first 14 and second 16 peripheral edges each have a length of four and one quarter inches (4¼") and the third 18 and fourth 20 peripheral edges each have a length of six inches (6") for creating the standard rectangular mailer assembly 10.

The mailer assembly 10 of the subject invention includes an integral card 38 formed within the first 12 and second 24 layers of card stock. As appreciated, the card 38 has a front 28 and back 30 side which correlate to the front 28 and back 30 sides of the mailer 10. As also appreciated, the card 38 has a substantially identical construction as the mailer assembly 10 itself discussed above. Further, the integral card 38 has printed matter on both front 28 and back 30 sides. Preferably, the printed matter on the front side 28 of the mailer 10 can extend over into and blend with the printed matter on the front side 28 of the card 38 as shown in FIG. 1.

Referring also to FIG. 2, the card 38 is preferably a coupon card 38 having a plurality of mini-coupons 40 detachably cut into the card 38 through the second layer of card stock 24, i.e., the back side 30 of the mailer 10 and card 38. The mini-coupons 40 are imprinted to convey any number of suitable coupon type messages as is desired. The mini-coupons 40 are preferably formed in two parallel rows of three mini-coupons 40 each. As appreciated, any number of mini-coupons 40 may be positioned in any particular fashion within the card 38. The coupon card 38 further includes an information area 42 positioned adjacent the mini-coupons 40 for conveying selected information to a user. As illustrated, the information area 42 is positioned lengthwise between the two rows of mini-coupons 40. As appreciated, the information area 42 may be positioned to one side of the mini-coupons 40 or crossway of the mini-coupons 40.

The mailer assembly 10 is characterized by a series of score lines 44, 46, 48 cut through the first 12 and second 24 layers of card stock and the liner 22 and spaced from the peripheral edges 14, 16, 18, 20 of the first 12 and second 24 layers of card stock to completely define the card 38 integrally disposed within the mailer assembly 10 and to securely maintain the card 38 within the mailer assembly 10. Hence, the coupon card 38 is completely disposed within the mailer 10 such that the score lines 44, 46, 48 do not intersect the peripheral edges 14, 16, 18, 20. This additionally increases the structural integrity of the mailer 10. Specifically, the score lines 44, 46, 48 do not create a weak point in the mailer 10 as opposed to the prior art designs discussed above.

The first 12 and second 24 layers of card stock further include a plurality of connection points 50 disposed between each of the series of score lines 44, 46, 48 to integrally support the card 38 within the mailer assembly 10. The connection points 50 are best shown in FIGS. 1 and 2 and are areas of the layers of card stock 12, 24 which were not cut or scored such that the coupon card 38 is loosely attached to the mailer 10. For illustrative purposes, the connection points 50 are shown slightly exaggerated. To remove the coupon card 38, a user pushes on the card 38 until the connection points 50 are broken which completely severs the coupon card 38 from the mailer 10 (FIG. 2). The coupon card 38 can then be utilized, i.e., the mini-coupons 40 can be peeled off and redeemed. The release coating on the card 38 allows the mini-coupons 40 to be removed from the liner 22 without damaging the remaining portions of the coupon card 38. Preferably, each of the removed mini-coupons 40 are defined by a portion of the second layer of card stock 24 and the associated adhesive.

After the coupon card 38 is punched out, the remaining portion of the mailer assembly 10 will typically be discarded. As discussed above, the coupon card 38, therefore, must have printed matter on both the front 28 and back 30 sides such that the user can associate the card 38 with a particular vendor. Preferably, logos, promotional messages, company addresses and other like information will be imprinted on the front side 28 of the coupon card 38 and the mini-coupons 40, with the discounted information, will be imprinted and scored on the back side 30 of the coupon card 38.

A plurality of borders 52, 54, 56 are formed between the series of score lines 44, 46, 48 and the peripheral edges 14, 16, 18, 20 to integrally support the card 38 within the mailer assembly 10. The borders 52, 54, 56 completely surround the coupon card 38 and are formed due to the spacing of the score lines 44, 46, 48 from the peripheral edges 14, 16, 18, 20. The borders 52, 54, 56 securely mount the coupon card 38 within the mailer 10 even during the rigorous processing of the bulk rate mailers 10 through the postal service system.

The coupon card 38 is further defined by upper 44, lower 46 and opposing side 48 score lines with the upper 44 and lower 46 score lines and the opposing side 48 score lines each being substantially parallel to each other to define a substantially rectangular card 38. Preferably, the upper 44 and lower 46 score lines each have a combined length of two and one eight inches (2⅛") and opposing side score lines 48 each having a combined length of three and three eights inches (3⅜") to define the rectangular card 38 which is similar in size to a standard credit card. As appreciated, the overall scope of the subject invention is in no way limited to the specific size of the integral coupon card 38. As discussed above, the connection points 50 interconnect each of the score lines 44, 46, 48. Preferably, there are two connection points 50 interconnecting each of three upper 44 and lower 46 score lines and there are three connection points 50 interconnecting each of four opposing side score lines 48.

The plurality of borders 52, 54, 56 include an upper border 52 formed between the upper score line 44 and the third peripheral edge 18, a lower border 54 formed between the lower score line 46 and the fourth peripheral edge 20, and a side border 56 formed between one of the side score lines 48 and the first peripheral edge 14. The rectangular card 38 is positioned closer to the first 14 and third 18 peripheral edges than the second 16 and fourth 20 peripheral edges to offset the card 38 within the mailer assembly 10. The offset coupon card 38 is desirable such that there is sufficient space for the addressing 34 and postal 36 areas on the mailer 10.

During the manufacture of the mailer assemblies 10, the mailer 10 is preferably formed and then the coupon card 38 is punched out of the mailer 10. Even more preferably, the mailer assembly 10 is manufactured by a manufacturing machine of the type disclosed in U.S. Pat. No. 5,776,287 which is assigned to the assignee of the subject invention and incorporated herein by reference.

The manufacture of the mailer assemblies 10 begins with a single continuous sheet of card stock 58. The initial layout of the mailer 10 is illustrated in FIG. 4. The first 12 and second 24 layers of card stock are initially attached together with the exterior surfaces both facing upward to form the continuous sheet of card stock 58. The sheet of card stock 58 has the adhesive layer 26 and liner 22 adhered to a bottom surface thereof. The sheet of stock 58 is then fed into a printing station (not shown) which prints the desired logos, promotional messages, etc. on the exterior surface in two parallel rows at the same time. A certain amount of exterior material 60 is disposed around the perimeter of the rows to hold the first 12 and second 24 layers of card stock together.

The parallel rows define the first 12 and second 24 layers of card stock wherein the first layer 12 becomes the front side 28 of the mailer assembly 10 and coupon card 38 and the second layer 24 becomes the back side 30 of the mailer assembly 10 and coupon card 38. As appreciated, the rows or layers 12, 24 may be of any width or design to coordinate with the desired shape of the mailer assembly 10 and coupon card 38. A laminating device (not shown) applies the clear laminate 32 to the exterior surface of the first 12 and second 24 layers of card stock for viewing the printed matter. A cutting device (not shown) separates the continuous sheet of stock 58 into the first 12 and second 24 layers of card stock. The first layer 12 is then inverted and the liner 22 is removed therefrom. The first 12 and second 24 layers are then aligned and the adhesive layer 26 of the first layer of card stock 12 is moved into a bonded relationship with the liner 22 remaining on the second layer of card stock 24. The continuous sheet of stock 58 having printed matter on the exterior surface in two parallel rows has now been transformed into a continuous series of two sided one-piece mailer assemblies 10.

The back surface of the mailer assembly 10 is scored by a scoring wheel (not shown) to form a perimeter of the mini-coupons 40. The scoring is substantial enough such that the mini-coupons 40 may be removed without affecting the adhesion of the remaining mini-coupons 40. Specifically, as discussed above, the scoring passes through the laminate 32 on the back side 30, second layer of card stock 24 and the associated adhesive layer 26. The scoring does not, however, sever the liner 22 nor the first layer of card stock 12. Each mini-coupon 40 is therefore formed of the laminate 32, second layer of card stock 24 and associated adhesive layer 26. As appreciated, even when all of the mini-coupons 40 are removed, the coupon card 38 will always maintain the laminate 32 on the front side 28, the first layer of card stock 12, associated adhesive layer 26 and the liner 22, thereby ensuring its structural integrity.

The series of mailer assemblies 10 passes under a punch wheel (not shown) for removing any exterior material 60 from the bonded first 12 and second 24 layers of card stock. The punch wheel also punches out the coupon card 38 from the mailer assembly 10. As discussed above, the punch wheel scores through the entire thickness of the mailer assembly 10 to outline the coupon card 38. The plurality of connection points 50 are retained such that the coupon card 38 remains loosely attached to the mailer assembly 10. Accordingly, the plurality of mailer assemblies 10 are now created which each have an integral card 38 with substantially the same printed matter disposed on each exterior surface of the first 12 and second 24 layers of card stock for creating a series of substantially identical coupon cards 38.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, wherein reference numerals are merely for convenience and are not to be any way limiting, the invention may be practiced otherwise than as specifically described.

What is claimed is:

1. A promotional one-piece mailer assembly comprising;

a first layer of card stock having an exterior surface and an interior surface with a plurality of outer peripheral edges, a liner adhered to said interior surface of said first layer of card stock, a second layer of card stock having an exterior surface and an interior surface with a plurality of outer peripheral edges aligned with said peripheral edges of said first layer of card stock, said interior surface of said second layer of card stock adhered to said liner to sandwich said liner between said first and second layers of card stock, an integral card formed within said first and second layers of card stock, and a plurality of mini-coupons detachably cut into said integral card through said second layer of card stock, said assembly characterized by a series of score lines cut through said first and second layers of card stock and said liner and spaced from said peripheral edges of said first and second layers of card stock to completely define said card integrally disposed within said mailer assembly and to securely maintain said card within said mailer assembly.

2. An assembly as set forth in claim 1 wherein said first and second layers of card stock further include a plurality of connection points disposed between each of said series of score lines to integrally support said card within said mailer assembly.

3. An assembly as set forth in claim 2 further including printed matter imprinted on each of said exterior surfaces of said first and second layers of card stock.

4. An assembly as set forth in claim 3 further including a laminate adhered to each of said exterior surfaces of said first and second layers of card stock over said printed matter.

5. An assembly as set forth in claim 4 further including an adhesive layer disposed between each of said interior surfaces of said first and second layers of card stock and said liner to adhere said first and second layers of card stock to said liner.

6. An assembly as set forth in claim 5 further including a plurality of borders formed between said series of score lines and said peripheral edges to integrally support said card within said mailer assembly.

7. An assembly as set forth in claim 6 wherein said card further includes an information area positioned adjacent said mini-coupons for conveying selected information to a user.

8. An assembly as set forth in claim 7 further including an addressing area disposed on said exterior surface of said first layer of card stock for imprinting a portion of said printed matter.

9. An assembly as set forth in claim 8 further including a postage area disposed on said exterior surface of said first layer of card stock for imprinting another portion of said printed matter.

10. An assembly as set forth in claim 6 further including a plurality of mailer assemblies each having an integral card with substantially the same printed matter disposed on each exterior surface of the first and second layers of card stock for creating a series of substantially identical cards.

11. An assembly as set forth in claim 6 wherein said peripheral edges of said first and second layers of card stock each include first, second, third and fourth peripheral edges with said first and second peripheral edges and said third and fourth peripheral edges each being substantially parallel to each other to define a substantially rectangular mailer assembly.

12. An assembly as set forth in claim 11 wherein said first and second peripheral edges each have a length of four and one quarter inches and said third and fourth peripheral edges each have a length of six inches for creating said rectangular mailer assembly.

13. An assembly as set forth in claim 11 wherein said integral card is further defined by upper, lower and opposing side score lines with said upper and lower score lines and said opposing side score lines each being substantially parallel to each other to define a substantially rectangular card.

14. An assembly as set forth in claim 13 wherein said upper and lower score lines each have a combined length of two and one eight inches and opposing side score lines each having a combined length of three and three eights inches to define said rectangular card.

15. An assembly as set forth in claim 13 wherein said rectangular card is positioned closer to said first and third peripheral edges than said second and fourth peripheral edges to offset said card within said mailer assembly.

16. An assembly as set forth in claim 15 wherein said plurality of borders includes an upper border formed between said upper score line and said third peripheral edge, a lower border formed between said lower score line and said fourth peripheral edge, and a side border formed between one of said side score lines and said first peripheral edge.

* * * * *